(12) United States Patent
Steele, Jr. et al.

(10) Patent No.: US 7,890,722 B1
(45) Date of Patent: Feb. 15, 2011

(54) SEQUENTIALLY PERFORMED COMPOUND COMPARE-AND-SWAP

(75) Inventors: Guy L. Steele, Jr., Lexington, MA (US); Ole Agesen, Palo Alto, CA (US); Nir N. Shavit, Cambridge, MA (US)

(73) Assignee: Oracle America, Inc., Redwood City, CA (US)

( * ) Notice: Subject to any disclaimer, the term of this patent is extended or adjusted under 35 U.S.C. 154(b) by 1174 days.

(21) Appl. No.: 11/099,720

(22) Filed: Apr. 6, 2005

Related U.S. Application Data

(62) Division of application No. 09/829,207, filed on Apr. 9, 2001, now Pat. No. 6,880,071.

(51) Int. Cl.
*G06F 12/14* (2006.01)
(52) U.S. Cl. ............... 711/163; 711/141; 711/152; 711/165; 712/225; 712/244
(58) Field of Classification Search ............... 711/152, 711/141, 163, 165; 712/244, 225
See application file for complete search history.

(56) References Cited

U.S. PATENT DOCUMENTS

| | | | |
|---|---|---|---|
| 3,886,525 A | 5/1975 | Brown et al. | |
| 4,584,640 A | 4/1986 | MacGregor et al. | |
| 4,604,694 A * | 8/1986 | Hough | 710/200 |
| 4,847,754 A | 7/1989 | Obermarck et al. | |
| 5,081,572 A | 1/1992 | Arnold | |
| 5,222,238 A | 6/1993 | Zobre et al. | |
| 5,224,215 A | 6/1993 | Disbrow | |
| 5,870,537 A * | 2/1999 | Kern et al. | 714/6 |
| 5,893,151 A | 4/1999 | Merchant | |
| 6,128,710 A | 10/2000 | Greenspan et al. | |
| 6,223,335 B1 | 4/2001 | Cartwright, Jr. et al. | |
| 6,718,446 B1 * | 4/2004 | Peters et al. | 711/162 |

FOREIGN PATENT DOCUMENTS

| | | |
|---|---|---|
| EP | 0 366 585 | 5/1990 |
| EP | 0 466 339 | 1/1992 |
| WO | WO 86/00434 | 1/1986 |

OTHER PUBLICATIONS

U.S. Appl. No. 09/710,218, filed Nov. 10, 2000 and naming as inventor(s) Harris, Timothy.

(Continued)

*Primary Examiner*—Sanjiv Shah
*Assistant Examiner*—Jae U Yu
(74) *Attorney, Agent, or Firm*—Osha • Liang LLP

(57) ABSTRACT

A sequentially performed implementation of a compound compare-and-swap (nCAS) operation has been developed. In one implementation, a double compare-and-swap (DCAS) operation does not result in a fault, interrupt, or trap in the situation where memory address A2 is invalid and the contents of memory address A1 are unequal to C1. In some realizations, memory locations addressed by a sequentially performed nCAS or DCAS instruction are reserved (e.g., locked) in a predefined order in accordance with a fixed total order of memory locations. In this way, deadlock between concurrently executed instances of sequentially performed nCAS instructions can be avoided. Other realizations defer responsibility for deadlock avoidance to the programmer.

10 Claims, 3 Drawing Sheets

OTHER PUBLICATIONS

Bacon, David F. et al., "Thin Locks: Featherweight Synchronization for Java," ACM SIGPLAN Notices, vol. 33, No. 5, pp. 258-268, May 1998.

Israeli, Amos et al., "Disjoint-Access-Parallel Implementations of Strong Shared Memory Primitives," *Proc. 13th Annual ACM Symposium on Principles of Distributed Computing*, pp. 151-160, ACM Press, New York, NY, 1994.

Lamport, Leslie, "A Fast Mutual Exclusion Algorithm," *ACM Transactions on Computer Systems*, vol. 5, No. 1, pp. 1-11, 1987.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Moir, Mark, "Transparent Support for Wait-Free Transactions," *Proceedings of the 11th International Workshop on Distributed Algorithms*, pp. 305-319, Springer-Verlag, London, UK, 1997.

Shavit, N., et al., "Software Transactional Memory," *Distributed Computing*, vol. 10, No. 2, pp. 99-116, Feb. 1997.

*IBM Technical Disclosure Bulletin*, "Conditional Multiple Store Instruction", vol. 22, No. 9, pp. 4297-4299, Feb. 1, 1980.

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design And Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling For Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots In O(n log n) Operations," *SIAM Journal on Computing*, 27(2):319-340, Apr. 1998.

Agesen, Ole, et al.: "DCAS-Based Concurrent Deques," *SPAA 2000. Proceedings of the 12th Annual ACM Symposium on Parallel Algorithms and Architectures*, pp. 137-146, ACM Press, New York, NY, ISBN: 1-58113-185-2, 2000.

* cited by examiner

SEQUENTIALLY PERFORMED COMPOUND COMPARE-AND-SWAP

CROSS-REFERENCE TO RELATED APPLICATION(S)

This application is a divisional of co-pending U.S. patent application Ser. No. 09/829,207, filed Apr. 9, 2001, entitled "Sequentially Performed Compound Compare-and-Swap," naming as inventors Guy L. Steele, Jr., Ole Agesen and Nir N. Shavit, which application is incorporated herein by reference in its entirety.

BACKGROUND OF THE INVENTION

1. Field of the Invention

The invention relates to coordination amongst distributed computational systems and, in particular, to techniques for performing compound operations on memory in linearizable form.

2. Description of the Related Art

Computer systems often provide primitive instructions or operations that perform compound operations on memory in a linearizable form (i.e., as if atomically). For example, the VAX computer architecture provided instructions to directly support insert and delete operations on double-ended queues. Other processor architectures have provided simpler operations, such as a "test-and-set" operation (e.g., as provided by the IBM 360), a "fetch-and-add" (e.g., as provided by the NYU Ultracomputer), a "load locked" and "store conditional" operation pair (e.g., as provided by the DEC, now Compaq, Alpha), or "compare-and-swap" (e.g., as provided by the Motorola 68000 and processors conforming to the SPARC™ architecture).

SPARC architecture based processors are available from Sun Microsystems, Inc, Mountain View, Calif. SPARC trademarks are used under license and are trademarks or registered trademarks of SPARC International, Inc. in the United States and other countries. Products bearing SPARC trademarks are based upon an architecture developed by Sun Microsystems.

A "compare-and-swap" operation (CAS) typically accepts three values or quantities: a memory address A, a comparison value C, and a new value N. The operation fetches and examines the contents V of memory at address A. If those contents V are equal to C, then N is stored into the memory location at address A, replacing V. Whether or not V matches C, V is returned or saved in a register for later inspection (possibly replacing either C or N, depending on the implementation). All this is implemented in a linearizable, if not atomic, fashion. Such an operation may be notated as "CAS(A, C, N)".

A more powerful and convenient operation is "double compare-and-swap" (DCAS), which accepts six values: memory addresses $A_1$ and $A_2$, comparison values $C_1$ and $C_2$, and new values $N_1$ and $N_2$. The operation fetches and examines the contents $V_1$ of memory at address $A_1$ and the contents $V_2$ of memory at address $A_2$. If $V_1$ equals $C_1$ and $V_2$ equals $C_2$, then $N_1$ is stored into the memory location at address $A_1$, replacing $V_1$, and $N_2$ is stored into the memory location at address $A_2$, replacing $V_2$. Whether or not $V_1$ matches $C_1$ and whether or not $V_2$ matches $C_2$, $V_1$ and $V_2$ are returned or saved in registers for later inspection. All this is implemented in a linearizable, if not atomic, fashion. Such an operation may be notated as "DCAS($A_1$, $A_2$, $C_1$, $C_2$, $N_1$, $N_2$)".

The SPARC version 9 architecture supports an implementation of CAS instruction on both 32-bit-wide and 64-bit-wide operands, but does not provide a DCAS instruction. On the other hand, the Motorola 68040 processor supports a double compare-and-swap instruction (on the 68040 it is called "CAS2"). Unfortunately, the CAS2 instruction effectively locks the entire memory system rather than locking first one location and then another. The net result is that deadlock is not possible but CAS2 instructions executed by separate processors are always serialized in time even if they access distinct memory locations.

There is substantial theoretical literature on the use of CAS operations and ordinary DCAS operations in the design of non-blocking algorithms. For example, Massalin and Pu proposed a collection of DCAS-based concurrent algorithms. They built a lock-free operating system kernel based on the DCAS operation offered by the Motorola 68040 processor, implementing structures such as stacks, FIFO-queues, and linked lists. See e.g., H. Massalin and C. Pu, *A Lock-Free Multiprocessor OS Kernel*, Technical Report TR CUCS-005-9, Columbia University, New York, N.Y. (1991).

Greenwald, a strong advocate of DCAS, built a collection of DCAS-based concurrent data structures, some of which improve on those of Massalin and Pu in terms of their properties and performance. In addition, he proposed various implementations of DCAS in software and hardware. See e.g., M. Greenwald, *Non-Blocking Synchronization and System Design*, Ph.D. thesis, Stanford University Technical Report STAN-CS-TR-99-1624, Palo Alto, Calif. (1999).

A drawback of the DCAS operation (as implemented by the Motorola 68040 processor and as described in the literature) is that it requires both of memory addresses, $A_1$ and $A_2$, to be valid. If either of the memory addresses $A_1$ or $A_2$ is invalid, then a memory fault occurs, typically resulting in an interrupt or trap. For certain kinds of algorithms that could otherwise profitably make use of the DCAS operation, such behavior is undesirable. For example, under certain conditions, the memory address $A_2$ might be invalid or unusable, but only when the contents of memory address $A_1$ are unequal to $C_1$.

SUMMARY OF THE INVENTION

Accordingly, it has been discovered that a sequentially performed implementation of a double compare-and-swap (DCAS) operation can be defined, which does not result in a fault, interrupt, or trap in the situation where memory address $A_2$ is invalid and the contents of memory address $A_1$ are unequal to $C_1$. More generally, a sequentially performed compound compare-and-swap (nCAS) operation or other compound synchronization operation can be defined. In some realizations, memory locations addressed by a sequentially performed nCAS instruction are reserved (e.g., locked) in a predefined order in accordance with a fixed total order of memory locations. In this way, deadlock between concurrently executed instances of sequentially performed nCAS instructions can be avoided. Other realizations defer responsibility for deadlock avoidance (e.g., to the programmer).

In general, two or more storage locations are accessed by compound synchronization operations in accordance with the present invention. Ordered locking of storage locations, if provided, is in accordance with any fixed total order of storage location. For example, ascending memory address order or descending memory address order are both suitable fixed total orders. While realizations in accordance with the present invention typically provide coordination between concurrently executed instances of a particular compound synchronization instruction (e.g., a DCAS), coordination between differing instructions (e.g., between 2-way and 3-way sequentially performed nCAS instructions) or between differing instruction types (e.g., between an nCAS instruction and a corresponding sequentially performed compound synchronization operation of some other type) may be desirable in some implementations. Indeed, the use of a compare-and-swap synchronization primitive is merely illustrative. Other realizations in accordance with the present invention may build on other synchronization or access primitives, e.g., read-modify-write, read-compute-conditionally write, test-and-set, etc. Similarly, while the exemplary sequentially performed DCAS and nCAS operations described herein employ the same type of access primitive in each leg thereof (i.e., a compare-and-swap), other realizations need not. For example, sequentially performed compound synchronization operations are envisioned in which earlier- and later-reserved storage locations may be accessed using different access primitives.

In some implementations, locking of memory locations is provided on a cache line basis. In others, other reservation schemes (e.g., per location locking) may be provided. More generally, reservation may include any implementation-appropriate mechanism for obtaining some form of exclusive access or rights with respect to the reserved object. In some realizations of a compound synchronization operation in accordance with the present invention, the signaling of a fault corresponding to a later reserved memory location depends on a value read from an earlier reserved memory location. For example, in some realizations of an nCAS operation, signaling of a fault corresponding to a later reserved memory location depends on successful comparison of a value read from an earlier reserved memory location with a corresponding test value.

Processors, instruction sets, computer systems and computer program products implementing and/or exploiting such sequentially performed compound compare-and-swap (nCAS) operations are all envisioned. These and other realizations will be better understood based on the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
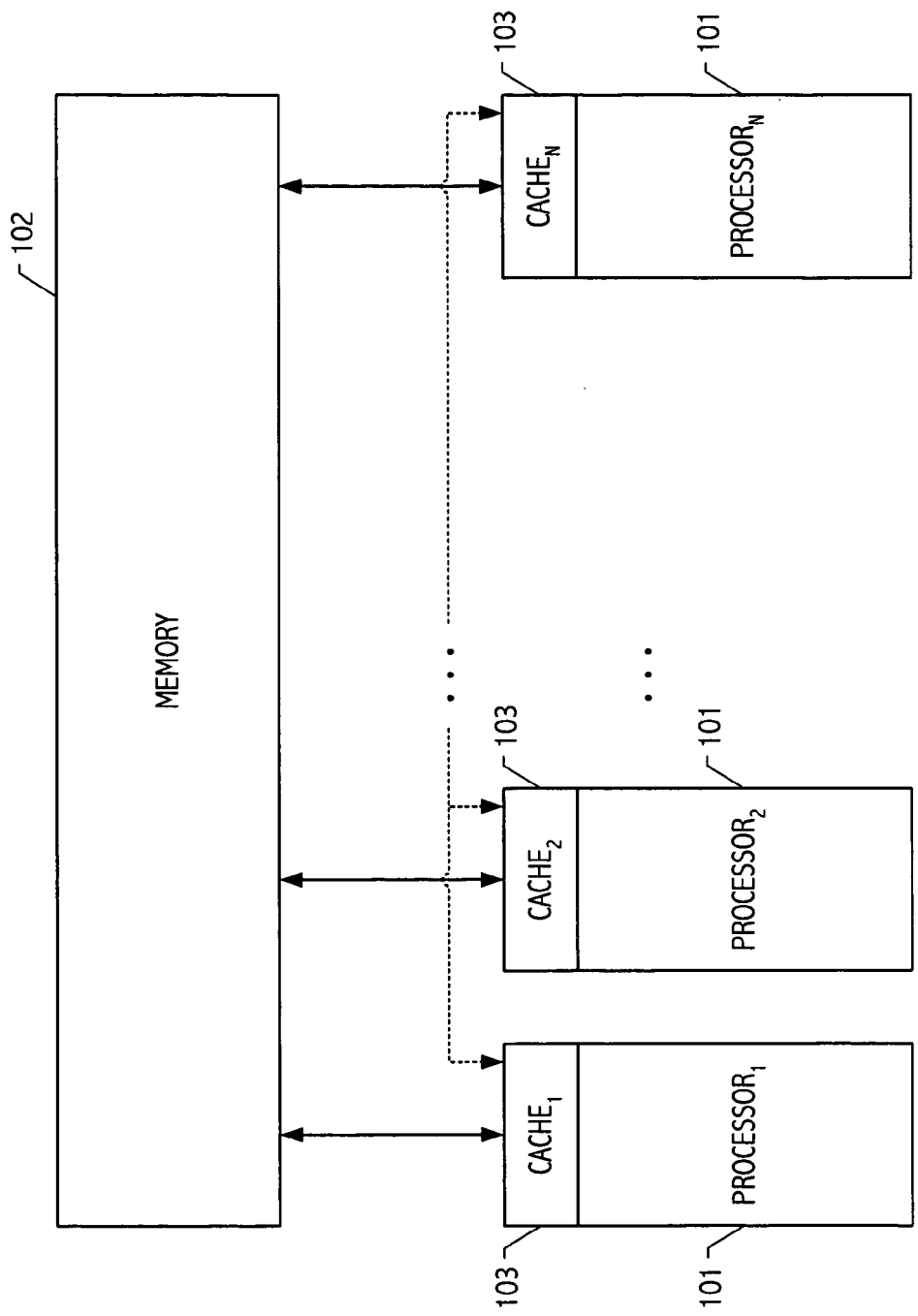
FIG. 1 depicts a cache-coherent shared memory multiprocessor suitable for some realizations of the present invention.

FIG. 1 depicts an exemplary cache-coherent shared memory multiprocessor configuration. Plural processors 101 share a memory space 102. Each processor 101 implements a sequentially performed compound synchronization operation, such as a sequentially performed double compare-and-swap (DCAS) or compound compare-and-swap operation (nCAS), in accordance with the present invention. While a variety of sequentially performed compound synchronization operation implementations are envisioned, the description that follows focuses on an exemplary sequentially performed double compare-and-swap instruction (DCAS). The description of particular sequentially performed DCAS and nCAS implementations is illustrative and should not be taken as limiting. Indeed, based on the description thereof, persons of ordinary skill in the art will appreciate a wide variety of suitable implementations and exploitations, including processor, instruction set, computer system and computer program product implementations and exploitations, of this and other sequentially performed compound synchronization operations.

In general, a coherent presentation of memory space 102 and its component storage locations is maintained using any suitable techniques and/or coherence protocols. In the illustrated configuration, interactions between processors 101 and memory space 102 are mediated by respective caches 103. Accordingly, in an exemplary realization in accordance with FIG. 1, "cache-coherent" means that, from the perspective of each processor and its associated memory cache, the shared memory is logically divided into portions of, for example, 128 bytes (called "cache lines") and that the system includes a memory controller protocol that allows each processor's cache either to "own" a cache line or to "share" a given cache line. Only one processor cache at a time may own a cache line, but any number of processors may share a cache line that is not owned. When a processor cache acquires ownership of a cache line, a copy of the data in that cache line is delivered to the cache of that processor. A processor whose cache owns a cache line is permitted to read and write the data for that cache line using the copy in its cache. If a processor whose cache owns a cache line changes the copy of the data in its cache, then the updated data must be transferred back to the shared memory at some point before ownership is released. A processor whose cache shares a cache line is permitted to read its copy of the cache line data but not to update it.

During execution of most instructions, the caches of respective processors acquire and release sharing or ownership of cache lines automatically as necessary to accomplish the reading and writing of data that may be requested by the processors. However, it is also possible for a processor to request its cache to acquire ownership of a cache line and to refuse to yield ownership until its processor directs otherwise. Such a request from a processor to its cache is called "locking" a cache line, and permission from the processor to its cache to yield ownership of a locked cache line is called "unlocking" the cache line.

Figure 2:
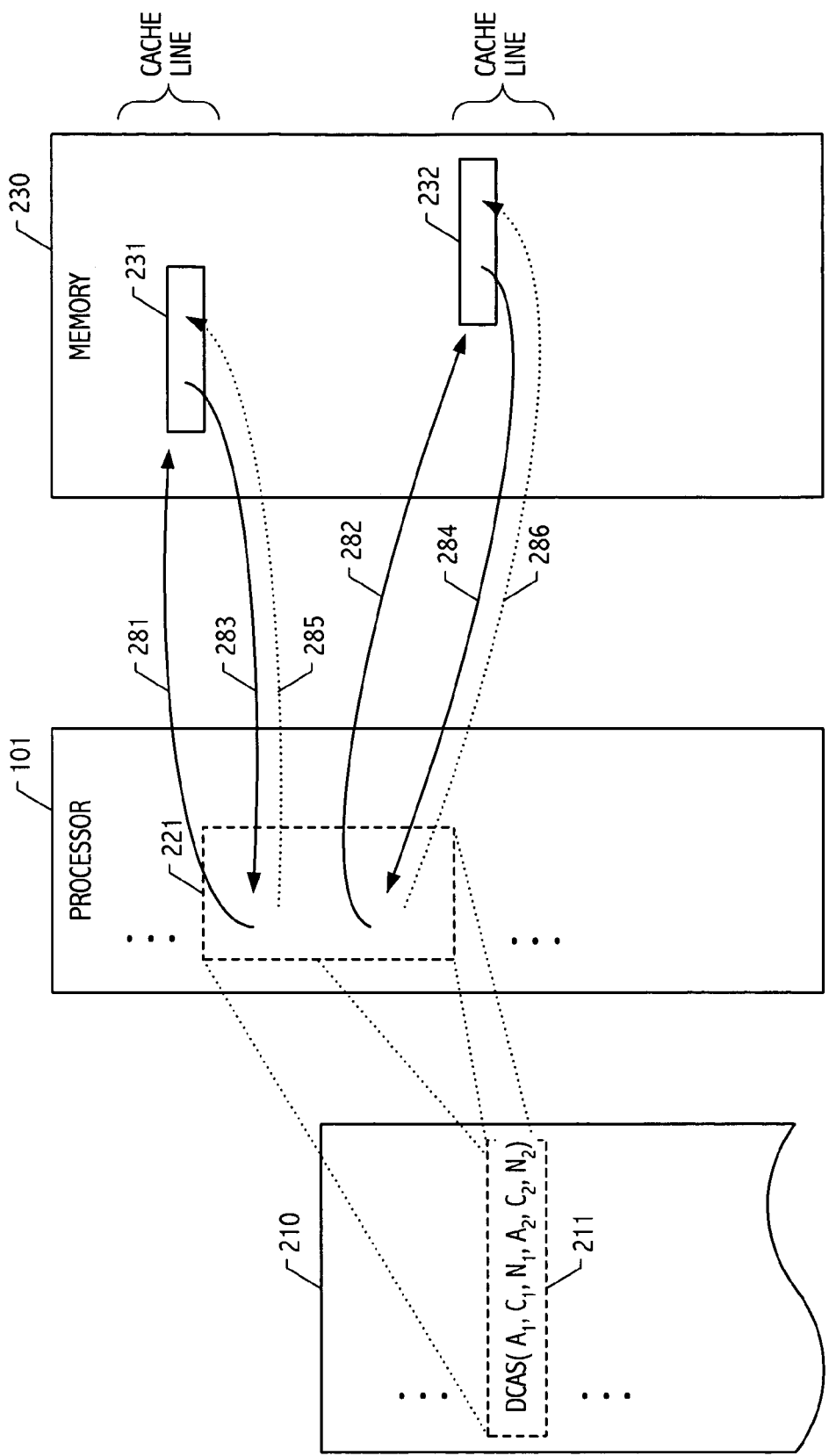
FIG. 2 depicts operation of a processor executing a sequentially performed double compare-and-swap instruction in accordance with some realizations of the present invention.

FIG. 2 illustrates operation of a processor 101 in response to a sequence or set of instructions 210 that includes a sequential DCAS instruction 211. Operation 221 of processor 101 includes interactions with two locations 231, 232 of memory space 230. In general, locations 231 and 232 may be associated with the same or differing cache lines. As typically represented, the sequential DCAS instruction accepts six operands: two memory addresses $A_1$ and $A_2$ corresponding to locations 231 and 232, respectively, two comparison values $C_1$ and $C_2$, and two new values $N_1$ and $N_2$. Although a variety of definitions are possible, the values of operands $A_1$, $C_1$, $N_1$, $A_2$, $C_2$ and $N_2$ are typically stored in registers (not shown) of processor 101 and identified by corresponding register specifiers. As will be described in greater detail below, interactions with locations 231 and 232 include reservation (281, 282) of the locations (or cache lines associated therewith), read access (283, 284) to contents of the locations, and write access (285, 286) to contents of the locations. For purposes of illustration, the description that follows assumes that memory is byte-addressed, and that CL is an integer such that 2 to the power CL is the number of bytes in a cache line.

Sequentially Performed DCAS

Figure 3:
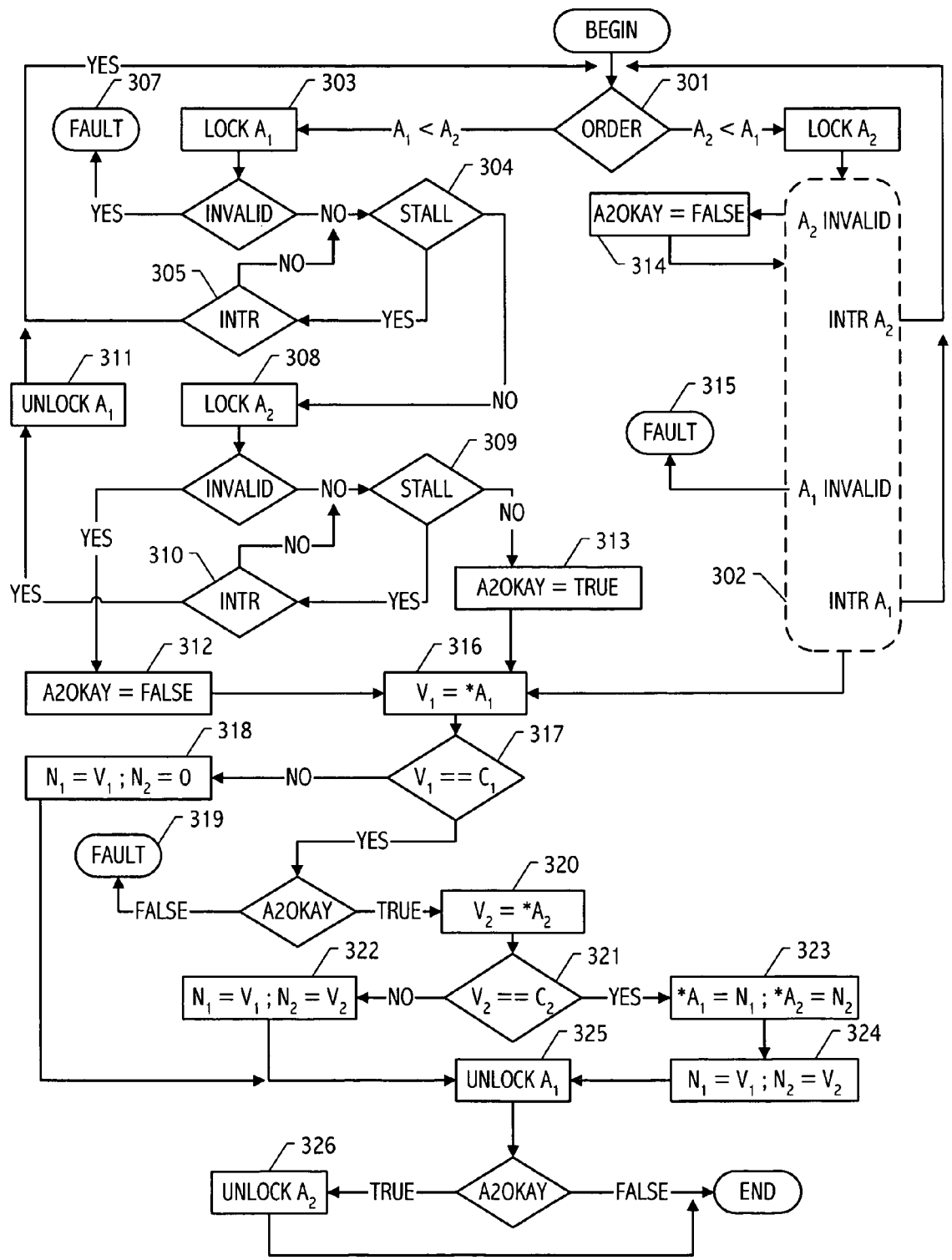
FIG. 3 depicts a flow chart of operations in accordance with an exemplary implementation of a sequentially performed double compare-and-swap instruction in accordance with some realizations of the present invention.

Operation of processor 101 in response to sequential DCAS instruction 211 is now described with reference to FIG. 3. For simplicity of illustration, one major branch of the implementation (namely that corresponding to the situation where $A_1$ and $A_2$ correspond to distinct cache lines and where $A_1 < A_2$ in some fixed total order of memory locations) is detailed in FIG. 3. Other branches (e.g., where $A_2 < A_1$ and where $A_1$ and $A_2$ correspond to the same cache line) are summarized or omitted and will be understood in the context of the textual description.

In response to a sequential performed DCAS instruction, DCAS($A_1$, $A_2$, $C_1$, $C_2$, $N_1$, $N_2$), processor 101 behaves as follows:

1. First, branch (301) based on the relationship between addresses $A_1$ and $A_2$. If the addresses $A_1$ and $A_2$ are identical except possibly for the low CL bits (such as if the identified memory locations belong to the same cache line), set SHARED to true and go to step 2. Otherwise, if $A_1$ is less than $A_2$, set SHARED to false and go to step 3. Otherwise, set SHARED to false and go to step 5. Note that, for simplicity, the branch to step 2 is not illustrated in FIG. 3. The branch to step 3 and related flows are detailed in FIG. 3, while the branch to step 5 and related flows are summarized (302).
2. Attempt to lock the cache line that includes the memory words identified by addresses $A_1$ and $A_2$. If the cache line is being shared or is owned by another processor, the request will stall until the cache line becomes available. If it is necessary to interrupt this processor during a stall, then the program counter is left pointing to the sequential DCAS instruction, as if execution of this instruction had not commenced. If the memory address $A_1$ is invalid, then no cache line ownership is obtained and a memory fault is signaled in the customary manner for address $A_1$, resulting in a trap or interrupt that terminates execution of the instruction. If the memory address $A_2$ is invalid, then set A2OKAY to false; otherwise set A2OKAY to true. Go to step 7.
3. Attempt to lock (303) the cache line that includes the memory word identified by address $A_1$. If the cache line is being shared or is owned by another processor, the request will stall (304) until the cache line becomes available. If it is necessary to interrupt (305) processor 101 during a stall, then the program counter is left pointing to the sequential DCAS instruction, as if execution of the instruction had not commenced. If the memory address $A_1$ is invalid, then no cache line ownership is obtained and a memory fault is signaled (307) in the customary manner for address $A_1$, resulting in a trap or interrupt that terminates execution of the instruction. Continue to step 4.
4. Attempt to lock (308) the cache line that includes the memory word identified by address $A_2$. As before, if the cache line is being shared or is owned by another processor, the request will stall (309) until the cache line becomes available. If it is necessary to interrupt (310) this processor during a stall, then the cache line that was locked at 303 is unlocked (311) and the program counter is left pointing to the sequential DCAS instruction, as if execution of this instruction had not commenced. If the memory address $A_2$ is invalid, no reservation is performed and no memory fault is signaled, but A2OKAY is set (312) to false. Otherwise A2OKAY is set to true (313). Go to step 7.
5. Attempt to lock the cache line that includes the memory word identified by address $A_2$. If the cache line is being shared or is owned by another processor, the request will stall until the cache line becomes available. If it is necessary to interrupt this processor during a stall, then the program counter is left pointing to the sequential DCAS instruction, as if execution of this instruction had not commenced. If the memory address $A_2$ is invalid, no reservation is performed and no memory fault is signaled, but A2OKAY is set (314) to false. Otherwise A2OKAY is set to true. Continue with step 6.
6. Attempt to lock the cache line that includes the memory word identified by address $A_1$. If the cache line is being shared or is owned by another processor, the request will stall until the cache line becomes available. If it is necessary to interrupt this processor during a stall, then the cache line that was locked in step 5 is unlocked and the program counter is left pointing to the sequential DCAS instruction, as if execution of the instruction had not commenced. If memory address $A_1$ is invalid, then no cache line ownership is obtained and a memory fault is signaled (315) in the customary manner for address $A_1$, resulting in a trap or interrupt that terminates execution of the instruction. Continue with step 7.
7. Fetch (316) from the cache of processor 101 the contents $V_1$ of the word at memory address $A_1$. Continue with step 8.
8. Compare (317) $V_1$ to $C_1$. If they differ, then replace $N_1$ with $V_1$ and replace $N_2$ with zero (318), and go to step 13. Otherwise continue with step 9.
9. If A2OKAY is false, signal (319) a memory fault for address $A_2$ in the customary manner, resulting in a trap or interrupt that terminates execution of the instruction. Otherwise, continue with step 10.
10. Fetch (320) from the cache of processor 101 the contents $V_2$ of the word at memory address $A_2$. Continue with step 11.
11. Compare (321) $V_2$ to $C_2$. If they differ, then replace $N_1$ with $V_1$ and replace $N_2$ with $V_2$ (322), and go to step 13. Otherwise continue with step 12.
12. Store (323) to the cache of processor 101 the value $N_1$ into the memory word at address $A_1$ and likewise store (323) $N_2$ into the memory word at address $A_2$. Replace $N_1$ with $V_1$ and replace $N_2$ with $V_2$. Continue with step 13.
13. Unlock (325) the cache line that includes the memory word identified by address $A_1$. If SHARED is false and A2OKAY is true, unlock (326) the cache line that includes the memory word identified by address $A_2$. Terminate execution of the instruction.

Based on the description herein, persons of ordinary skill in the art will appreciate that steps 1 through 6, above, reserve locations associated with addresses $A_1$ and $A_2$ in an order such that if the memory locations identified by these addresses belong to two different cache lines then the lower address is reserved first. This technique avoids a deadlock situation in which two separate processors each attempt to reserve two memory locations P and Q, but one processor reserves P first and then Q while the other reserves Q first and then P, allowing the possibility of each processor succeeding at its first reservation request and then stalling, waiting for the other processor to release its reservation.

While the above description has presumed use of cache line locking, other reservation mechanisms may also be employed. For example, locking may be performed on an individual storage location basis. Similarly, although memory address order (e.g., ascending or descending) is simple and multiple memory locations can be efficiently ordered in accordance therewith, other ordering techniques are also possible. In general, any fixed total order of storage locations employed by respective instances of sequentially performed compound synchronization operations is suitable.

In some realizations, deadlock avoidance need not be provided by the implementation of the sequentially performed DCAS instruction. For example, in one such realization, steps 5 and 6 (above) may be omitted and step 1 is updated to change the words "step 5" to "step 3." Accordingly, the DCAS implementation itself no longer discriminates based on the ordering of $A_1$ and $A_2$ with respect to some fixed total order of memory locations. Deadlock is a possibility and it is, instead, up to the programmer to use the DCAS instruction carefully to avoid deadlock. For example, code employing such a modified DCAS instruction may employ preceding instructions to ensure that operands are supplied to the DCAS instruction in accordance with a fixed total order of memory locations. In any case, other advantages of the DCAS implementation remain. For example, a memory error is not signaled on account of address $A_2$ if $V_1$ does not match $C_1$.

In some realizations, a sequentially performed DCAS instruction may also deliver a Boolean (single-bit) result to indicate succinctly whether or not data was successfully stored to memory. For example, steps 8 and 11 (above) may be suitably augmented by inserting "store FALSE into the Boolean result register" before the words "go to step 13." Similarly, step 12 (above) may be suitably augmented by inserting "Store TRUE into the Boolean result register" before the words "Continue with step 13."

Sequentially Performed nCAS

While a double compare-and-swap instruction serves as a useful example, persons of ordinary skill in the art will appreciate that the techniques described herein may be extended to other instructions including instructions that act upon a larger number of memory locations. For example, a sequential compound compare-and-swap (nCAS) accepts n memory addresses A[j] (1<=j<=n), n comparison values C[j] (1<=j<=n), and n new values N[j] (1<=j<=n).

Although other implementations are possible, it is simplest if a memory reservation on an invalid address never causes a memory fault. The operation of an nCAS instruction (n>=2) is as follows:

1. Grade the memory addresses in numerical order (as if by the "grade up" operation of Iverson's APL programming language) so as to produce a grade vector G that is a permutation of the integers from 1 to n such that, for all 1<=j<n, A[G[j]]<=A[G[j+1]].
2. Repeat the following for all values of j in order from 1 to n:
   If j=1, set SHARED[j] to false. If j>1 and memory addresses A[G[j-1]] and A[G[j]] both identify memory locations that belong to the same cache line, then set SHARED[j] to true and copy AOKAY[G[j-1] into AOKAY[G[j]]. Otherwise, set SHARED[j] to false and ask this processor's cache to lock the cache line that includes the memory word identified by address A[G[j]]. If the cache line is being shared or is owned by another processor, the request will stall until the cache line becomes available. If it is necessary to interrupt this processor during a stall, then (first) for all values of k in order from 1 to j-1, if SHARED is FALSE and AOKAY[G[j]] is TRUE, the cache line that includes the memory word identified by address A[G[k]] is unlocked; and (second) the program counter is left pointing to the sequential nCAS instruction, as if execution of this instruction had not commenced. If the memory address A[G[j]] is invalid, no reservation is performed and no memory fault is signaled, but AOKAY[G[j]] is set to false. Otherwise AOKAY[G[j]] is set to true.
3. Repeat the following for all values of j in order from 1 to n:
   If AOKAY[j] is false, signal a memory fault for address A[j] in the customary manner, resulting in a trap or interrupt that terminates execution of the instruction. Otherwise, fetch (from this processor's cache) the contents V[j] of the word at memory address A[j]. Then, compare V[j] to C[j]. If they differ, then set L to j-1, terminate the repetition of this step, and go to step 6.
4. Repeat the following for all values of j in order from 1 to n:
   Store (to this processor's cache) the value N[j] into the memory word at address A[j].
5. Set L to n.
6. Repeat the following for all values of j in order from 1 to L (if L equals zero, do not perform this step at all):
   Replace N[j] with V[j].
7. Repeat the following for all values of j in order from L+1 to n (if L equals n, do not perform this step at all):
   Replace N[j] with zero.
8. Repeat the following for all values of j in order from 1 to n:
   If SHARED[j] is false and AOKAY[G[j]] is true, unlock the cache line that includes the memory word identified by address A[G[j]].

Note that nCAS never locks any given cache line more than once and that it locks them in ascending address order. In one variation, each occurrence of "SHARED[j]" (in steps 2 and 8, above) may be replaced by "SHARED[G[j]]".

As before, the sequential nCAS instruction may be augmented to deliver a Boolean (single-bit) result to indicate succinctly whether or not data was successfully stored to memory. For example, step 3 (above) may be augmented by inserting "store FALSE into the Boolean result register" before the words "go to step 6", and step 5 may be augmented by inserting "Store TRUE into the Boolean result register." before the words "Set L to n."

Also as before, operation of a modified sequential nCAS instruction may omit the ordering of memory addresses before locking the cache lines and instead lock in the order in which the addresses are presented. For such a modified instruction, it is as if the vector G were always treated as consisting of the integers from 1 through n in order, rather than as a vector that indicates how to sort the vector A of addresses. As before, the burden of deadlock avoidance may be shifted to the programmer.

While the above description of sequentially performed DCAS and nCAS instructions has presumed that signaling of faults corresponding to a later reserved memory location is entirely dependent on success of an access to an earlier reserved memory location, variants of the sequentially performed DCAS or nCAS instruction may distinguish more than one category of invalid or unusable memory address and signal (or not) accordingly. For example, a memory fault of one category may be selectively signaled in accordance with the outcome of comparison operations as outlined above, whereas a memory fault of another category is always signaled regardless of the outcome of the comparison operations. In one exploitation, presentation of a memory address that is a multiple of 4 (i.e., properly aligned), but for which there is no entry in a virtual page table might trigger a memory fault only if the memory contents of all preceding addresses equal their corresponding memory values, whereas presentation of a memory address that is not a multiple of 4 could always signal a memory fault.

While the invention has been described with reference to various embodiments, it will be understood that these embodiments are illustrative and that the scope of the invention is not limited to them. Many variations, modifications, additions, and improvements are possible. For example, compare-and-swap synchronization is only one suitable primitive form. Other compound synchronization operations may employ (i) fault signaling for an access to a later reserved storage location, which depends on an access to an earlier reserved storage location, and/or (ii) reservation of such storage locations in accordance with a fixed total order thereof.

Such compound synchronization operations may employ other access primitives such as test-and-set, read-modify-write, read-compute-conditionally write, etc. In addition, reservation of storage locations may be performed by locking associated cache lines or otherwise, such as by locking other groupings or by locking storage locations individually. Some realizations need not employ cache memory as an intermediary or locking facility. In general, any fixed total order of storage locations, including ascending and descending memory address orders, may be employed. Although certain exemplary compound synchronization instructions have been described that operate on shared byte-addressable memory, variations that employ other shared storage locations such as shared registers are also envisioned.

More generally, plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component in other configurations. These and other variations, modifications, additions, and improvements may fall within the scope of the invention as defined in the claims that follow.

What is claimed is:

1. A method for executing a compound synchronization operation (CSO), comprising:
   identifying, by a processor executing the CSO, a first memory location and a second memory location specified by the CSO in a plurality of memory locations, wherein the first memory location and the second memory location are within a single memory;
   locking the first memory location according to a fixed total order of the plurality of memory locations, wherein locking the first memory location comprises generating a copy of a cache line in the single memory comprising the first memory location and storing the copy in a single cache associated with the processor;
   determining, by the processor executing the CSO, that the second memory location is invalid after locking the first memory location;
   fetching, by the processor executing the CSO, an existing value from the first memory location in the single cache after determining that the second memory location is invalid;
   comparing, by the processor executing the CSO, the existing value with a test value specified by the CSO, wherein the existing value does not equal the test value;
   identifying, by the processor executing the CSO, a first new value specified by the CSO, wherein the first new value is for storage in the first memory location;
   replacing, by the processor executing the CSO, the first new value with the existing value in response to the existing value not equaling the test value;
   unlocking the first memory location without signaling a fault associated with the second memory location, after comparing the existing value and the test value; and
   terminating the CSO.

2. The method of claim 1, wherein the fixed total order of the plurality of memory locations is based on ascending memory address.

3. The method of claim 1, wherein the CSO is a compound compare-and-swap operation.

4. The method of claim 1, wherein the CSO is at least one selected from a group consisting of a compare-and-swap operation, a test-and-set operation, a read-compute-conditional write operation, and a read-modify-write operation.

5. The method of claim 1, further comprising:
   identifying, by the processor executing the CSO, a second new value specified by the CSO, wherein the second new value is for storage in the second memory location;
   replacing, by the processor executing the CSO, the second new value with zero in response to the existing value not equaling the test value.

6. A computer readable medium storing instructions to perform a compound synchronization operation (CSO), the instructions executable on a processor and comprising functionality to:
   identify a first memory location and a second memory location specified by the CSO in a plurality of memory locations, wherein the first memory location and the second memory location are within a single memory;
   lock the first memory location according to a fixed total order of the plurality of memory locations, wherein locking the first memory location comprises generating a copy of a cache line in the single memory comprising the first memory location and storing the copy in a single cache associated with the processor;
   determine that the second memory location is invalid after locking the first memory location;
   fetch an existing value from the first memory location in the single cache after determining that the second memory location is invalid;
   compare the existing value with a test value specified by the CSO, wherein the existing value does not equal the test value;
   identify a first new value specified by the CSO, wherein the first new value is for storage in the first memory location;
   replace the first new value with the existing value in response to the existing value not equaling the test value;
   unlock the first memory location without signaling a fault associated with the second memory location, after comparing the existing value and the test value; and
   terminate the CSO.

7. The computer readable medium of claim 6, wherein the fixed total order is descending memory address.

8. The computer readable medium of claim 6, wherein the CSO is a compound compare-and-swap operation.

9. The computer readable medium of claim 6, wherein the computer readable medium is selected from a group consisting of a magnetic storage medium, an optical storage medium, and an electronic storage medium.

10. The computer readable medium of claim 6, the instructions further comprising functionality to:
    identify a second new value specified by the CSO, wherein the second new value is for storage in the second memory location;
    replace the second new value with zero in response to the existing value not equaling the test value.

* * * * *